United States Patent [19]
Malhotra

[11] Patent Number: 4,997,697
[45] Date of Patent: Mar. 5, 1991

[54] TRANSPARENCIES

[75] Inventor: Shadi L. Malhotra, Mississauga, Canada

[73] Assignee: Xerox Corporation, Stamford, Conn.

[21] Appl. No.: 373,303

[22] Filed: Jun. 29, 1989

[51] Int. Cl.[5] ........ B32B 9/00
[52] U.S. Cl. ........ 428/195; 428/480; 428/483; 428/481; 428/534; 430/17; 430/33; 430/126
[58] Field of Search ........ 430/17, 33, 126, 195; 428/195, 209, 210, 480, 483, 481, 534

[56] References Cited

U.S. PATENT DOCUMENTS

| | | | |
|---|---|---|---|
| 3,203,832 | 8/1965 | Mino et al. | 117/36.3 |
| 3,488,189 | 1/1970 | Mayer et al. | 96/1.5 |
| 3,493,412 | 3/1970 | Johnston et al. | 117/17.5 |
| 3,535,112 | 10/1970 | Dolce et al. | 96/1.4 |
| 3,539,340 | 11/1970 | Dolce et al. | 96/1.4 |
| 3,539,341 | 11/1970 | Dolce et al. | 96/1.4 |
| 3,619,279 | 11/1971 | Johnston et al. | 117/115 UA |
| 3,833,293 | 9/1974 | Serio et al. | 355/17 |
| 3,854,942 | 12/1974 | Akman | 96/1.2 |
| 4,130,670 | 12/1978 | Gilliams et al. | 430/33 |
| 4,234,644 | 11/1980 | Blake et al. | 428/204 |
| 4,259,422 | 3/1981 | Davidson et al. | 430/17 |
| 4,301,195 | 11/1981 | Mercer et al. | 427/261 |
| 4,415,626 | 11/1983 | Hasenauer et al. | 428/483 |
| 4,419,004 | 12/1983 | Kuehnle | 355/3 TR |
| 4,419,005 | 12/1983 | Kuehnle | 355/3 TR |
| 4,480,003 | 10/1984 | Edwards et al. | 428/329 |
| 4,513,056 | 4/1985 | Vernois et al. | 428/264 |
| 4,529,650 | 7/1985 | Martinez | 428/336 |
| 4,592,954 | 6/1986 | Malhotra | 428/335 |
| 4,599,293 | 7/1986 | Eckell et al. | 430/126 |
| 4,891,285 | 1/1990 | Page et al. | 430/17 |

*Primary Examiner*—Patrick J. Ryan
*Attorney, Agent, or Firm*—E. O. Palazzo

[57] ABSTRACT

A transparent substrate material for receiving or containing an image and comprised of a supporting substrate base, an antistatic polymer layer coated on one or both sides of the substrate and comprised of hydrophilic cellulosic components, and a toner receiving polymer layer contained on one or both sides of the antistatic layer, which polymer is comprised of hydrophobic cellulose ethers, hydrophobic cellulose esters, or mixtures thereof, and wherein the toner receiving layer contains adhesive components.

30 Claims, No Drawings

TRANSPARENCIES

BACKGROUND OF THE INVENTION

This invention relates generally to transparencies, which transparencies are particularly useful in electrographic and xerographic imaging and printing processes. More specifically, the present invention is directed to transparencies with certain coatings thereover, which transparencies, that is for example transparent substrate materials for receiving or containing a toner image, possess compatibility with toner compositions, and permit improved toner flow in the imaged areas of the transparency thereby enabling images of high quality, that is for example images with optical densities of greater than 1.0 in several embodiments, excellent toner fix, about 100 percent in some instances, and no or minimized background deposits to be permanently formed thereon. Thus, in one embodiment of the present invention there are provided transparencies useful in electrophotographic including xerographic imaging systems, which transparencies are comprised of a supporting substrate, a first coating of, for example, an antistatic hydrophilic hydroxyethyl cellulose polymer layer present on one or both sides of the supporting substrate, and a second toner receiving coating thereover of a hydrophobic blend of, for example, ethylhydroxyethyl cellulose and an epichlorohydrin/ethylene oxide copolymer which blend can be present on one or both (two) sides of the antistatic layer, and wherein the second layer may contain optional filler components. Also, the present invention is directed to imaged transparencies comprised of a supporting substrate, a first antistatic coating of, for example, a hydrophilic cellulose derivative polymer layer present on one or on both (two) sides of the substrate, and a second toner receiving coating thereover comprised of a hydrophobic cellulose ether or cellulose esters with low melt adhesives, such as ethylene/vinyl acetate copolymers and poly(-chloroprene) and wherein the second layer may contain optional filler components.

In the formation and development of xerographic images, there is generally applied to a latent image generated on a photoconductive member a toner composition comprised of resin particles and pigment particles. Thereafter, the image is transferred to a suitable substrate, and affixed thereto by, for example, heat, pressure, or a combination thereof. It is also known that transparencies can be selected as a receiver for the transferred developed image originating from the photoconductive member, which transparencies are suitable for selection with commercially available overhead projectors. Generally, these transparent sheets are comprised of thin films of one or more organic resins, such as polyesters, which have the disadvantage in that undesirable poor toner composition adhesion results in toner flaking off from the transparency.

In the Xerox Corporation 1005™ color imaging apparatus, a black color can be obtained from a combination of magenta, cyan and yellow pigments in three passes whereas in the Xerox Corporation 1025™ and 1075™ apparatuses this is achieved in one pass using carbon black based toners. Generally, the amount of the three pass images deposited toner layer of magenta, cyan, yellow to produce black, is greater than that of carbon black based toners deposited by single pass copiers. Thus the 1005™ apparatus (black) requires more heat to fuse the three layers together on substrates such as transparencies compared to pigmented black produced by the Xerox Corporation 1025™ or 1075™ apparatuses. Although these imaging apparatuses are equipped with variable fusing temperature options, there is an optimum temperature for maintaining an effective life span of the machine components; the lower the temperature, the longer the life span. To accommodate these transparency requirements, three pass color copiers are often decelerated in the transparency mode to generate extra heat for toner fusing. However, this extra heat is usually not sufficient to effectively fix the toner to the transparency, and the toners are fused by a post-solvent treatment in a solvent vapor-fuser. These problems are avoided or minimized with the transparencies of the present invention.

Many different types of transparencies are known, reference for example U.S. Pat. No. 3,535,112, which illustrates transparencies comprised of a supporting substrate, and polyamide overcoatings. Additionally, there are disclosed in U.S. Pat. No. 3,539,340 transparencies comprised of a supporting substrate and coatings thereover of vinylchloride copolymers. Also known are transparencies with overcoatings of styrene acrylate, or methacrylate ester copolymers, reference U.S. Pat. No. 4,071,362; transparencies with blends of acrylic polymers and vinyl chloride/vinylacetate polymers, as illustrated in U.S. Pat. No. 4,085,245; and transparencies with coatings of hydrophilic colloids as recited in U.S. Pat. No. 4,259,422. Furthermore, there is illustrated in U.S. Pat. Nos. (1) 4,489,122 transparencies with elastomeric polymers overcoated with poly(vinylacetate), or terpolymers of methylmethacrylate, ethyl acrylate, and isobutylacrylate; and (2) 4,526,847 transparencies comprised of overcoating of nitrocellulose and a plasticizer. The disclosures of each of the aforementioned patents are totally incorporated herein by reference.

In a patentability search report the following prior art U.S. Pat. Nos. were provided: 3,488,189 which discloses fused toner images on an imaging surface wherein the toner particles contain a thermoplastic resin, the imaging surface carries a solid crystalline plasticizer having a lower melting point than the melting range of the thermoplastic resin, and wherein the resulting toner image is heat fused, reference the abstract of the disclosure; see also columns 3,4, and 5 especially at line 71 to column 6; a similar teaching is present in U.S. Pat. No. 3,493,412, and U.S. Pat. No. 3,619,279, and more specifically the '279 patent mentions in the abstract that the external surfaces of the toner receiving member is substantially free of a material plasticizable by a solid crystalline plasticizer, and typically a plasticizer such as ethylene glycol dibenzoate may be available on the surface of the paper; further see column 3 lines 22 to 32 of the '279 patent for the types of receiving surfaces that may be treated; and a selection of patents, namely U.S. Pat. Nos. 3,535,112; 3,539,340; 3,539,341; 3,833,293; 3,854,942; 4,234,644; 4,259,422; 4,419,004; 4,419,005; and 4,480,003, that pertain to the preparation of transparencies by electrostatographic imaging techniques according to the aforementioned report.

Also known are transparency sheet materials for use in plain paper electrostatic copiers comprising (a) a flexible, transparent, heat resistant, polymeric film base, (b) an image receiving layer present upon a first surface of the film base, and (c) a layer of electrically conductive prime coat interposed between the image receiving layer and the film base. This sheet material can be used in either powder-toned or liquid-toned plain paper copiers for making transparencies, reference U.S. Pat. No. 4,711,816, the disclosure of which is totally incorporated herein by reference.

Additionally known is a transparency to be imaged as a copy sheet in plain paper copiers which transparency contains a transparent sheet having a surface adapted to receive an image imprinted thereon in a suitable electrostatic imaging apparatus and an opaque coating forming an opaque border completely around the sheet, reference U.S. Pat. No. 4,637,974, the disclosure of which is totally incorporated herein by reference.

Moreover known is the preparation of transparencies by electrostatic means, reference U.S. Pat. No. 4,370,379, the disclosure of which is totally incorporated herein by reference, wherein there is described the transferring of a toner image to a polyester film containing, for example, a substrate and a biaxially stretched poly(ethylene terephthalate) film, including Mylar. Furthermore, in U.S. Pat. No. 4,234,644, the disclosure of which is totally incorporated herein by reference, there is disclosed a composite lamination film for electrophoretically toned images deposited on a plastic dielectric receptor sheet comprising in combination an optically transparent flexible support layer, and an optically transparent flexible intermediate layer of a heat softenable film applied to one side of the support; and wherein the intermediate layer possesses adhesion to the support.

With further respect to the prior art, there are illustrated in U.S. Pat. No. 4,370,379, the disclosure of which is totally incorporated herein by reference, transparencies with, for example, a polyester (Mylar) substrate with a transparent plastic film substrate 2, and an undercoating layer 3 formed on at least one surface of the substrate 2, and a toner receiving layer 4 formed on the undercoated layer, reference column 2, line 44. As coatings for layer 3, there can be utilized the resins as illustrated in column 3, including quaternary ammonium salts, while for layer 4 there are selected thermoplastic resins having a glass transition temperature of from a minus 50° to 150° C., such as acrylic resins, including ethylacrylate, methylmethacrylate, and propyl methacrylate; and acrylic acid, methacrylic acid, maleic acids, and fumaric acid, reference column 4, lines 23 to 65. At line 61 of this patent, there is mentioned that thermoplastic resin binders other than acrylic resins can be selected, such as styrene resins, including polystyrene, and styrene butadiene copolymers, vinyl chloride resins, vinylacetate resins, and solvent soluble linear polyester resins. A similar teaching is present in U.S. Pat. No. 4,480,003 wherein there is disclosed a transparency film comprised of a film base coated with an image receiving layer containing thermoplastic transparent polymethacrylate polymers, reference column 2, line 16, which films are useful in plain paper electrostatic copiers. Other suitable materials for the image receiving layer include polyesters, cellulosics, poly(vinyl acetate), and acrylonitrile-butadiene-styrene terpolymers, reference column 3, lines 45 to 53. Similar teachings are present in U.S. Pat. No. 4,599,293, wherein there is described a toner transfer film for picking up a toner image from a toner treated surface, and affixing the image, wherein the film contains a clear transparent base and a layer firmly adhered thereto, which is also clear and transparent, and is comprised of the specific components as detailed in column 2, line 16. Examples of suitable binders for the transparent film that are disclosed in this patent include polymeric or prepolymeric substances, such as styrene polymers, acrylic, and methacrylate ester polymers, styrene butadienes, isoprenes, and the like, reference column 4, lines 7 to 39. The coatings recited in the aforementioned patents contain primarily amorphous polymers which do not undergo the desired softening during the fusing of the xerographic imaging processes such as the color process utilized in the Xerox Corporation 1005™, and therefore these coatings do not usually aid in the flow of pigmented toners. This can result in images of low optical density which are not totally transparent. In contrast with the coatings of the U.S. Pat. No. 4,956,225, the disclosure of which is totally incorporated herein by reference, which include, for example, polymers with a high degree of crystallinity and sharp melting points, there is enabled an increase in toner flow in the imaged areas thus yielding images, especially with mixed colors such as green, black and purple with acceptable optical density values.

More specifically there is described in the aforementioned U.S. Pat. No. 4,956,225, D/86267, transparencies suitable for electrographic and xerographic imaging comprised of a polymeric substrate with a toner receptive coating on one surface thereof, which coating is comprised of blends of: poly(ethylene oxide) and carboxymethyl cellulose; poly(ethylene oxide), carboxymethyl cellulose and hydroxypropyl cellulose; poly(ethylene oxide) and vinylidene fluoride/hexafluoropropylene copolymer, poly(chloroprene) and poly($\alpha$-methylstyrene); poly(caprolactone) and poly($\alpha$-methylstyrene); poly(vinylisobutylether) and poly($\alpha$-methylstyrene); blends of poly(caprolactone) and poly($\rho$-isopropyl $\alpha$-methylstyrene); blends of poly(1,4-butylene adipate) and poly($\alpha$-methylstyrene); chlorinated poly(propylene) and poly($\alpha$-methylstyrene); chlorinated poly(ethylene) and poly($\alpha$-methylstyrene); and chlorinated rubber and poly($\alpha$-methylstyrene). Further, in another aspect of U.S. Pat. No. 4,956,225, the disclosure of which is totally incorporated herein by reference, there are provided transparencies suitable for electrographic and xerographic imaging processes comprised of a supporting polymeric substrate with a toner receptive coating on one surface thereof comprised of: (a) a first layer coating of a crystalline polymer selected from the group consisting of poly(chloroprene), chlorinated rubbers, blends of poly(ethylene oxide), and vinylidene fluoride/hexafluoropropylene copolymers, chlorinated poly(propylene), chlorinated poly(ethylene), poly(vinylmethyl ketone), poly(caprolactone), poly(1,4-butylene adipate), poly(vinylmethyl ether), and poly(vinyl isobutylether); and (b) a second overcoating layer comprised of a cellulose ether selected from the group consisting of hydroxypropyl methyl cellulose, hydroxypropyl cellulose, and ethyl cellulose.

Although the transparencies prepared with the coatings cited in the above mentioned U.S. Pat. No. 4,956,225 usually have higher optical densities than those obtained on commercially available (Xerox Corporation 3R2780) transparencies, when imaged with the Xerox Corporation 1005™ vapor fusing was necessary with for example, the apparatus commercially available from Xerox Corporation as the Xerox VFA for a period of 60 seconds with a solvent such as 1.1.1 trichloroethane to render them transparent. This disadvantage is avoided with the transparencies of the present invention.

Further, although the transparencies illustrated in the prior art are suitable in most instances for their intended purposes, there remains a need for new transparencies with coatings thereover, which transparencies are useful in electrophotographic and xerographic imaging processes, and that will enable the formation of images with high optical densities. Additionally, there is a need for transparencies which permit improved toner flow in the imaged areas thereby enabling high quality transparent images with acceptable optical densities. There is also a need for transparencies with specific coatings that possess other advantages, inclusive of enabling excellent adhesion between the toned image and the transparency or coated papers selected, and wherein images with excellent resolution and no background deposits are obtained. There is also a need for transparencies that can be used in more than one type of xerographic or electrophotographic apparatuses, as is the situation with the transparencies of the present invention. Another need of the present invention resides in providing transparencies with coatings that do not (block) stick at, for example, high relative humidities of, for example, 50 to 80 percent relative humidity and at a temperature of 50° C. in many embodiments.

SUMMARY OF THE INVENTION

It is an object of the present invention to provide transparencies with many of the advantages illustrated herein.

Another object of the present invention resides in the provision of transparencies with certain coatings, which transparencies are useful in electrographic, especially ionographic and xerographic imaging processes.

Also, in another object of the present invention there are provided transparencies with certain coatings thereover enabling images thereon with high optical densities, and wherein increased toner flow is obtained when imaged for example with commercially available xerographic imaging apparatuses and ionographic printers, inclusive of printers commercially available from Delphax such as the Delphax S-6000.

Another object of the present invention resides in imaged transparencies that permit the substantial elimination of beading during mixing of the primary colors to generate secondary colors such as, for example, mixtures of cyan and yellow enabling green colors.

Moreover, another object of the present invention resides in imaged transparencies that have substantial permanence for extended time periods.

Another object of the present invention resides in the provision of transparencies for xerographic or electrographic processes where the antistatic layer in contact with the toner receiving layer is present on the top as well as bottom side of the substrate. Furthermore, the aforementioned transparency with the two layered structure on the top of the substrate as well as on the bottom of the substrate can be of the same composition when, for example, the transparency is selected for one type of electrophotographic process, such as the Xerox Corporation 1005 TM imaging apparatus, or of a different compositon when one transparency is selected for two apparatuses, such as the Xerox Corporation 1005 TM imaging apparatus, the Xerox Corporation 1025 TM, or the Xerox Corporation 1075 TM with different feeding as well as toner fusing temperature latitudes.

In still another object of the present invention, there are provided polymer coatings for transparencies, which coatings avoid the necessity of transparentization of images by treatment with a solvent such as 1,1,1, trichloro ethane in the solvent-vapor fusing process subsequent to the imaging of these transparencies in, for example, the Xerox Corporation 1005 TM imaging apparatus.

These and other objects of the present invention are accomplished by providing transparancies with coatings thereover in accordance with one embodiment of the present invention there are provided transparencies with coatings thereover which are compatible with the toner compositions selected for development, and wherein the coatings enable images thereon with acceptable optical densities to be obtained. More specifically, in one embodiment of the present invention there are provided transparencies for xerographic and ionographic processes comprised of a supporting substrate and a first coating of, for example, hydrophilic hydroxyethyl cellulose, and a second coating thereover of a hydrophobic blend of ethylhydroxyethyl cellulose with a low melting adhesive component such as an epichlorohydrin/ethylene oxide copolymer. Another embodiment of the present invention is directed to a transparency or a transparent substrate for receiving a toner image comprised of a supporting substrate, an antistatic polymer layer coated on both sides of the substrate and comprised of hydrophilic cellulosic derivatives, and a toner receiving polymer layer contained on both sides of the antistatic layer, which polymer is comprised of hydrophobic cellulose ethers, or cellulose esters and wherein the toner receiving layer contains low melt adhesive components. Also, the present invention is directed to a transparency comprised of a supporting substrate, an antistatic polymer layer coating and a toner receiving polymer layer which polymer is comprised of hydrophobic cellulose ethers, hydrophobic cellulose esters, or mixtures or blends thereof, and low melt adhesive components, which transparency can contain thereon developed images. With the transparencies of the present invention there is provided, for example, the elimination of the post solvent treatment since the transparency contains a low melt adhesive component which softens during the toner fusing process and aids in toner flow to yield high optical density transparent images.

In yet another embodiment, the present invention is directed to transparencies comprised of a supporting substrate such as a polyester; a hydrophilic transparent layer which functions primarily as an antistatic layer, such as hydroxy ethyl cellulose; and a top toner receiving coating of a hydrophobic blend of ethylhydroxyethyl cellulose and a low melting adhesive such as an epichlorohydrin/ethylene oxide copolymer. This two layered structure of antistatic layer in contact with the toner receiving layer is preferably present on the top as well as on the bottom side of the supporting substrate. Also, the polymeric components of the toner receiving layer which may be present on the top side of the transparency may be the same as those present on the bottom, but in different proportions, for example, a blend of ethylhydroxyethyl cellulose, 30 percent by weight and epichlorohydrin/ethylene oxide copolymer, 70 percent by weight can be used on the top side as a toner receiving layer for the Xerox Corporation 1005 whereas a blend of ethylhydroxyethyl cellulose, 50 percent by weight, and epichlorohydrin/ethylene oxide copolymer, 50 percent by weight can be used on the bottom for the Xerox Corporation 1025 carbon black toners; or they may be different for example a blend of ethylhydroxyethyl cellulose with epichlorohydrin-/ethylene oxide can be used as a toner receiving layer on the top side, whereas on the bottom side a blend of ethylhydroxyethyl cellulose with ethylene/vinyl acetate copolymer may be selected.

Specifically, in one embodiment of the present invention there are provided imaged transparencies comprised of a supporting substrate such as a polyester; an antistatic polymer layer, comprised of cellulosic components, such as hydroxyethyl cellulose, water soluble ethyl hydroxy ethyl cellulose (preferably with a degree of ethyl substitution less than 0.8), diethyl aminoethyl cellulose quaternized, hydroxy propyl trimethyl ammonium chloride hydroxyethyl cellulose quaternized and sodium carboxymethyl cellulose; and a toner receiving layer thereover comprised of hydrophobic cellulose ether, esters, mixtures thereof, and the like, including specifically mixtures, comprised for example of two or more polymers, in a common solvent, of ethylhydroxyethyl cellulose with low melting adhesives such as epichlorohydrin/ethylene oxide copolymer; blends of ethylhydroxyethyl cellulose with ethylene/vinyl acetate copolymer; blends of ethylhydroxyethyl cellulose with poly(caprolactone); blends of ethylhydroxyethyl cellulose with poly(chloroprene); blends of ethylhydroxyethyl cellulose with styrene-butadiene copolymers; blends of ethyl cellulose with epichlorohydrin-/ethylene oxide copolymer; blends of cellulose acetate hydrogen phthalate with ethylene/vinyl acetate copolymer; blends of cellulose acetate phthalate with ethylene/vinyl acetate copolymer; blends of hydroxypropyl methyl cellulose phthalate with ethylene/vinyl acetate copolymers; blends of cellulose acetate butyrate with ethylene/vinyl acetate copolymer; and blends of cellulose acetate with ethylene/vinyl acetate copolymer, wherein each blend contains an effective amount of polymer, such as from about 10 to about 90 percent by weight of a first polymer, and from about 90 to about 10 weight percent of a second polymer. Blends containing more than two polymers, present in effective amounts may also be selected in some embodiments of the present invention.

The blends mentioned herein refer in most instances to the ink receiving polymer component of the hydrophobic cellulose, hydrophobic cellulose ester, or mixtures thereof and a low melting adhesive. Therefore the toner receiving layer can be comprised of hydrophobic cellulose ether, esters, mixtures thereof, and the like, and low melting adhesive components. Examples of the low melting adhesive components mentioned herein, which components provide for example the surface of the transparency to soften thereby for example permitting effective acceptance of toner include epichlorohydrin/ethylene oxide copolymer, ethylene/vinyl acetate copolymer, poly(chloroprene), poly(caprolactone), styrene/butadiene copolymers, mixtures thereof, and the like. The adhesive is usually present in effective amounts of for example from about 10 to about 90 weight percent, and generally these adhesives have a low melting temperature of from about 50 to about 75 degrees Centigrade.

Illustrative examples of supporting substrates with a thickness of from about 50 microns to about 150 microns, and preferably of a thickness of from about 75 microns to about 125 microns that may be selected for the transparencies of the present invention include Mylar, commercially available from E. I. DuPont; Melinex, commercially available from Imperial Chemical Inc.; Celenar, commercially available from Celanese, Inc.; polycarbonates, especially Lexan; polysulfones, cellulose triacetate; polyvinyl chlorides; and the like, with Mylar being particularly preferred because of its availability and lower costs.

Specific examples of antistatic layer coating polymers of an effective thickness, for example, from about 2 to about 10 microns for one or each side of the supporting substrate and in contact with the supporting substrate, that can be selected for the aforementioned transparencies include, sodium carboxymethyl, cellulose (CMC 7MF, Hercules), hydroxyethyl cellulose (Natrosol 250 LR, Hercules), water soluble ethyl hydroxy ethyl cellulose (Bermocoll, Berol Kemi AB, Sweden), hydroxypropyl trimethyl ammonium chloride hydroxyethyl cellulose (Celquat H-100, L-200 National Starch), and diethyl ammonium chloride hydroxyethyl cellulose (DEAE Cellulose, quaternized). Preferred antistatic layer polymers include hydroxyethyl cellulose and hydroxypropyl trimethyl ammonium chloride hydroxyethyl cellulose primarily since they are readily available and possess excellent properties as antistatic materials. The antistatic layer is usually coated on both sides of the supporting substrate.

Illustrative examples of toner receiving layers of, for example, a thickness of from about 1 to about 5 microns and present on one side or surface, or for each side of the antistatic layer, and in contact with the antistatic layer include the cellulose components illustrated herein such as, blends of hydrophobic ethylhydroxyethyl cellulose (EHEC preferably with a degree of ethyl group substitution of between 0.8 and 2.0, available form Hercules Chemical) from about 10 to about 90 percent by weight and epichlorohydrin/ethylene oxide copolymer (Herclor C Hercules Inc., Hydrin 200 available from B. F. Goodrich with an epichlorohydrin content of 65 percent by weight) from about 90 to about 10 percent by weight in toluene; blends of hydrophobic ethylhydroxyethyl cellulose (EHEC, Hercules) from about 10 to about 90 percent by weight, and ethylene/-vinyl acetate (EVA copolymer with a vinyl acetate content of 40 percent by weight, available from Scientific Polymer Products) from about 90 to about 10 percent by weight in toluene; blends of hydrophobic ethylhydroxyethyl cellulose (EHEC, Hercules) from about 10 to about 90 percent by weight and poly(caprolactone)(PLC-700, Union Carbide) from about 90 to about 10 percent by weight in toluene; blends of hydrophobic ethylhydroxyethyl cellulose (EHEC, Hercules) from about 10 to about 90 percent by weight and poly(-chloroprene) (Scientific Polymer Products) from about 90 to about 10 percent by weight in toluene; blends of hydrophobic ethylhydroxyethyl cellulose (EHEC, Hercules) from about 10 to about 90 percent by weight and styrene-butadiene copolymers (Scientific Polymer Products with butadiene content of from about 10 to about 80 percent by weight) from about 90 to about 10 percent by weight in toluene; blends of hydrophobic ethyl cellulose (Ethocel, Hercules) from about 10 to about 90 percent by weight and epichlorohydrin/ethylene oxide (Herclor C, Hercules) from about 90 to about 10 percent by weight in toluene; blends of cellulose acetate hydrogen phthalate (CAHP, Eastman Kodak 6) from about 10 to about 90 percent by weight and ethylene/vinyl acetate (Scientific Polymer Products, with vinyl acetate content of between 40 to about 70 percent by weight) from about 90 to about 10 percent by weight in acetone; blends of hydroxy propylmethyl cellulose phthalate (HPMCP, Shin-Etsu Chemical) from about 10 to about 90 percent by weight and ethylene/vinyl acetate copolymer (Scientific Polymer Products, with vinyl acetate content of between about 40 to about 70 percent by weight) from about 90 to about 10 percent by weight in acetone; blends of cellulose acetate phthalate (CAP, Eastman Kodak Company) from about 10 to about 90 percent by weight and ethylene/vinyl acetate copolymer (Scientific Polymer Products, with vinyl acetate content of between 40 and 70 percent by weight) from about 90 to about 10 percent by weight in acetone; blends of cellulose acetate butyrate (CAB, Scientific Polymer Products) from about 10 to about 90 percent by weight and ethylene/vinyl acetate copolymer (Scientific Polymer Products, with a vinyl acetate content of between 40 to about 70 percent by weight) from about 90 to about 10 percent by weight in acetone; blends of cellulose acetate (Scientific Polymer Products) from about 10 to 90 percent by weight and ethylene/vinyl acetate (Scientific Polymer Product, with a vinyl acetate content of between 40 and 70 percent by weight) from about 90 to about 10 percent by weight in acetone, and the like. The blends can be comprised of from about 10 to about 90 percent by weight of one polymer, and from about 90 to about 10 weight percent of a second polymer.

The toner receiving layer where the developed image is contained in an embodiment of the present invention may include filler components in various effective amounts such as, for example, from about 2 to about 25 weight percent. Examples of fillers include colloidal silicas preferably present, for example, in one embodiment in an amount of 5 weight percent (available as Syloid 74 from W. R. Grace Company); calcium carbonate, titanium dioxide (Rutile), and the like. While it is not desired to be limited by theory, it is beleived that the primary purpose of the fillers is as a slip component for the transparency traction during the feeding process.

Specific examples of toner receiving layer components of for example, a thickness of from about 1 to about 7 microns and in contact with both sides of the antistatic layer, for transparencies selected for three pass color processes such as the process of the Xerox Corporation 1005™ include blends of hydrophobic ethylhydroxyethyl cellulose, 30 percent by weight and epichlorohydrin/ethylene oxide copolymer (epichlorohydrin content 65 percent by weight) 70 percent by weight, blends of hydrophobic ethylhydroxyethyl cellulose, 40 percent by weight and ethylene/vinyl acetate copolymer (vinyl acetate content 40 percent by weight) 60 percent by weight; blends of hydrophobic ethylhydroxyethyl cellulose, 50 percent by weight and poly(caprolactone) 50 percent by weight; blends of hydrophobic ethylhydroxy ethyl cellulose, 30 percent by weight and poly(chloroprene), 70 percent by weight; blends of hydrophobic ethylhydroxy ethyl cellulose, 10 percent by weight and styrene-butadiene block copolymer (styrene content 30 percent by weight), 90 percent by weight; blends of hydrophobic ethyl cellulose, 30 percent by weight and epichlorohydrin/ethylene oxide copolymer (epichlorohydrin content of 65 percent by weight) 70 percent by weight; blends of cellulose acetate hydrogen phthalate, 40 percent by weight and ethylene/vinyl acetate copolymer (vinyl acetate content 70 percent by weight) 60 percent by weight; blends of hydroxypropyl methyl cellulose phthalate, 40 percent by weight and ethylene/vinyl acetate copolymer (vinyl acetate content of 70 percent by weight) 60 percent by weight; blends of cellulose acetate phthalate, 40 percent by weight and ethylene/vinyl acetate (vinyl acetate content of 70 percent by weight) 60 percent by weight; blends of cellulose acetate butyrate, 40 percent by weight, and ethylene/vinyl acetate copolymer (vinyl acetate content 70 percent by weight) 60 percent by weight; and blends of cellulose acetate 40 percent by weight and ethylene/vinyl acetate (vinyl acetate content 70 percent by weight) 60 percent by weight.

Examples of specific toner receiving layer composition of for example a thickness of from about 1 to about 10 microns and in contact on both sides with the antistatic layer for transparencies preferably selected for single pass carbon black based copiers such as the Xerox Corporation 1075™ or 1025™, include blends of hydrophobic ethylhydroxyethyl cellulose; 50 percent by weight and epichlorohydrin/ethylene oxide copolymer (epichlorohydrin content 65 percent by weight) 50 percent by weight; blends of hydrophobic ethylhydroxyethyl cellulose 60 percent by weight and ethylene/vinyl acetate copolymer (vinyl acetate content 40 percent by weight) 40 percent by weight; blends of hydrophobic ethylhydroxy ethyl cellulose, 70 percent by weight and poly(caprolactone, 30 percent by weight; blends of hydrophobic ethylhydroxyethyl cellulose 50 percent by weight and poly(chloroprene) 50 percent by weight; blends of hydrophobic ethylhydroxyethyl cellulose 30 percent by weight and styrene-butadiene block copolymer (styrene content, 30 percent by weight) 70 percent by weight; blends of hydrophobic ethyl cellulose 50 percent by weight and epichlorohydrin/ethylene oxide copolymer (epichlorohydrin content 65 percent by weight) 50 percent by weight; blends of cellulose acetate hydrogen phthalate, 60 percent by weight and ethylene/vinyl acetate (vinyl acetate content 70 percent by weight) 40 percent by weight; blends of hydroxyproply methyl cellulose phthalate 60 percent by weight, and ethylene/vinyl acetate (vinyl acetate content 70 percent by weight) 40 percent by weight; blends of cellulose acetate butyrate 60 percent by weight and ethylene/vinyl acetate (vinyl acetate content 70 percent by weight) 40 percent by weight and blends of cellulose acetate 60 percent by weight and ethylene/vinyl acetate (vinyl acetate content of 70 percent by weight) 40 percent by weight. The preferred toner receiving layer polymers being blends of hydrophobic ethylhydroxyethyl cellulose with epichlorohydrin/ethylene oxide copolymer and blends of cellulose acetate butyrate with ethylene/vinyl acetate copolymer because of their easy availability, low cost and high performance that is 1005 color copier images with optical density of 1.7 to 1.8 for black, 0.85 to 0.95 for yellow, 1.45 to 1.50 for cyan and 1.43 to 1.65 for magenta.

The aforementioned polymer antistatic and toner receiving components can be present on the supporting substrates, such as Mylar, or paper in various thicknesses depending on the coatings selected and the other components utilized; however, generally the total thickness of the polymer coatings is from about 3 to about 15 microns, and preferably from about 7 to about 10 microns. Moreover, these coatings can be applied by a number of known techniques including reverse roll, extrusion and dip coating processes. In dip coating, a web of material to be coated is transported below the surface of the coating material by a single roll in such a manner that the exposed site is saturated, followed by the removal of any excess by a blade, bar or squeeze rolls. With reverse roll coating, the premetered material is transferred from a steel applicator roll to the web material moving in the opposite direction on a backing roll. Metering is performed in the gap precision-ground chilled iron rolls. The metering roll is stationary or is coating slowly in the opposite direction of the applicator roll. Also, in slot extrusion coating there is selected a slot die to apply coating materials with the die lips in close proximity to the web of material to be coated. Once the desired amount of coating has been applied to the web, the coating is dried at 70° to 100° C. in an air dryer.

In one specific process embodiment, the xerographic transparencies of the present invention are prepared by providing a supporting substrate such as Mylar in a thickness of from about 75 to about 125 microns; and applying to each side of the substrate by dip coating process, in a thickness of from about 2 to 10 microns, the antistatic layer such as a hydrophilic hydroxyethyl cellulose. Thereafter the antistatic coatings are air dried at 25° C. for 60 minutes in a fumehood equipped with adjustable volume exhaust system and the resulting transparency is subsequently dip coated with a toner receiving layer (coated on both sides) comprised, for example, of a blend of hydrophobic ethylhydroxyethyl cellulose and epichlorohydrin/ethylene oxide copolymer in a thickness of from about 1 to 5 microns. Coating is affected from 3 percent by weight of the polymer blend in toluene. Thereafter, the coating is air dried and the resulting two layered structure transparency can be utilized in various imaging apparatuses including the xerographic imaging apparatus such as those available commercially as the Xerox Corporation 1005 TM and wherein there results images thereon.

The optical density measurements recited herein, including the working examples, were obtained on a Pacific Spectrograph Color System. The system consists of two major components: an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution full dispersion, grating monochromator was used to scan the spectrum from 380 to 720 nanometers. The data terminal features a 12 inch CRT display, numerical keyboard for selection of operating parameters, and the entry of tristimulus values; and an alphanumeric keyboard for entry of product standard information.

The following examples are being supplied to further define specific embodiments of the present invention, it being noted that these examples are intended to illustrate and not limit the scope of the present invention. Parts and percentages are by weight unless otherwise indicated.

EXAMPLE I

There were prepared 10 coated transparency sheets each with a thickness of 100 microns by affecting a dip coating (both sides coated) of these sheets (10) into a coating solution of hydroxyethyl cellulose available as Natural 250 LR and obtained from Hercules Chemical Company which solution was present in a concentration of 3 percent by weight in water. Subsequent to air drying for 60 minutes at 25° C. in a fumehood equipped with adjustable volume exhaust system and monitoring the difference in weight prior to and subsequent to coating these dried sheets had present on each side 300 milligrams, 3 microns in thickness of the antistatic polymer layer of the hydroxyethyl cellulose polymer. These sheets were then coated on both sides with a toner receiving layer comprised of a blend of cellulose acetate butyrate obtained from Scientific Polymer Products Inc. 60 percent by weight and a ethylene/vinyl acetate copolymer low melting adhesive component obtained from Scientific Polymer Products Inc. (vinyl acetate content 70 percent by weight) 40 percent by weight which blend was present in acetone in a concentration of 2 percent by weight. Subsequent to air drying for 60 minutes at 25° C. and monitoring the difference in weight prior to and subsequent to coating, the coated sheets had present on each side 200 milligrams, 2 microns in thickness, of the toner receiving polymer layer in contact with the hydroxyethyl cellulose. These sheets were then fed into a Xerox Corporation 1005 TM color imaging apparatus and images were obtained on the aforementioned transparencies with an average optical density (that is the sum of the optical densities of the 10 sheets divided by 10) of 1.77 (black), 0.85 (yellow), 1.45 (cyan) and 1.62 (magenta). These images could not be handwiped or lifted with scotch tape (Minnesota Minning and Manufacturing) 60 seconds subsequent to their preparation.

EXAMPLE II

There were prepared 10 coated transparency sheets of a thickness of 100 microns by affecting a dip coating (both sides coated) of these sheets (10) into a coating solution of the hydroxyethyl cellulose of example I which solution was present in a concentration of 3 percent by weight in water. Subsequent to air drying for 60 minutes at 25° C. in a fumehood equipped with adjustable volume exhaust system and monitoring the difference in weight prior to and subsequent to coating, these dried sheets had present on each side 300 milligrams, 3 microns in thickness, of the antistatic polymer layer of hydroxyethyl cellulose polymer. These sheets were then coated on both sides, with a blend of hydrophobic ethylhydroxyethyl cellulose, obtained from Hercules Chemical Company Products Inc. 30 percent by weight and epichlorophydrin/ethylene oxide copolymer adhesive obtained from Scientific Polymer Products Inc. (epichlorohydrin content 65 percent by weight) 70 percent by weight which blend was present in toluene in a concentration of 2 percent by weight. Subsequent to air drying for 60 minutes at 25° C. and monitoring the difference in weight prior to and subsequent to coating, the coated sheets had present on each side 200 milligrams, 2 microns in thickness, of the toner receiving polymer layer/in contact with the antitstatic polymer layers of hydroxyethyl cellulose. These sheets were then fed into a Xerox Corporation 1005 TM color imaging apparatus and images were obtained on the aforementioned transparencies with an average optical density (that is the sum of the optical densities of the 10 sheets divided by 10) of 1.70 (black), 0.92 (yellow), 1.48 (cyan) and 1.45 (magenta). These images could not be handwiped or lifted with scotch tape 60 seconds subsequent to their preparation.

EXAMPLE III

There were prepared, 10 coated transparency sheets of a thickness of 100 microns by affecting a dip coating (both sides coated) into a solution of ethylhydroxyethyl cellulose obtained from Berol Kemi AB, Sweden which solution was present in a concentration of 3 percent by weight in water. Subsequent to air drying for 60 minutes at 25° C. in a fumehood equipped with adjustable volume exhaust system and monitoring the difference in weight prior to and subsequent to coating, these dried sheets had present on each side 300 milligrams, 3 microns in thickness, of the antitstatic polymer layer of ethylhydroxyethyl cellulose polymer. These sheets were then coated on both sides, with a toner receiving polymer layer of hydroxypropyl methyl cellulose phthalate, obtained from Shin Etsu Chemical Company of Japan, 60 percent by weight and ethylene/vinyl acetate copolymer adhesive, obtained from Scientific Polymer Products Inc., (vinyl acetate content 70 percent by weight) 40 percent by weight which blend was present in acetone in a concentration of 2 percent by weight. Subsequent to air drying for 60 minutes at 25° C. and monitoring the difference in weight prior to and subsequent to coating, the coated sheets had present on each side 200 milligrams, 2 microns in thickness, of the toner receiving polymer layers in contact with the antitstatic polymer layers of ethylhydroxyethyl cellulose. These sheets were then fed into a Xerox Corporation 1005 TM imaging apparatus and images were obtained on the transparencies with an average optical density (that is the sum of the optical densities of the 10 sheets divided by 10) of 1.67 (black), 0.90 (yellow), 1.39 (cyan) and 1.62 (magenta). These images could not be handwiped or lifted with scotch tape 60 seconds subsequent to their preparation.

EXAMPLE IV

There were prepared by a reverse roll process (single side each time), coated transparencies (10) on a Faustel Coater by providing a Mylar substrate (roll form) in a thickness of 100 microns and a coating thereover of an antistatic polymer layer of hydrophilic hydroxyethyl cellulose of Example I, which cellulose was present in a concentration of 3 percent by weight in water. Subsequent to air drying at 100° C. and monitoring the difference weight prior to and subsequent to coating, the dried Mylar roll had on one side 300 milligrams, 3 microns in thickness, of hydrophilic hydroxyethyl cellulose. The dried hydroxyethyl cellulose layer was further overcoated on the Faustel coater with a toner receiving layer of the hydrophobic ethylhydroxyethyl cellulose, of Example III, 30 percent by weight and epichlorohydrin/ethylene oxide copolymer of Example II (epichlorohydrin content 65 percent by weight) 70 percent by weight which blend was present in toluene in a concentration of 2 percent by weight. The dried (100° C.) layer of the blend in contact with the antitstatic polymer layer of hydroxyethyl cellulose had a thickness of 2 microns. Rewinding the coated side of Mylar on an empty core, and using this new roll the uncoated side of Mylar was coated first with the hydroxyethyl cellulose from aqueous solution as described above and then overcoated with a toner receiving polymer layer of the epichlorohydrin/ethylene oxide (epichlorohydrin content 65 percent by weight) 50 percent by weight and the hydrophobic ethylhydroxyethyl cellulose 50 percent by weight in toluene. The two side coated Mylar roll was cut into sheet form (20) ($8\frac{1}{2}\times 11'$) and 10 sheets were fed into the Xerox 1005 TM imaging apparatus and ten sheets were fed into the Xerox 1025 TM black only imaging apparatus. The toner receiving layer on the top side of Mylar, containing 70 percent by weight of epichlorohydrin/ethylene oxide copolymer was imaged with the Xerox 1005 TM and images on the transparencies of an average density of 1.7 (black), 0.95 (yellow), 1.50 (cyan) and 1.48 (magenta) were obtained. The toner receiving on the bottom side of Mylar having a 50:50 blend of ethylhydroxyethyl cellulose and epichlorohydrin/ethylene oxide copolymer (epichlorohydrin content 65 percent by weight) was imaged with the Xerox 1025 TM and there resulted images with an average optical density of 1.28 (black). These images could not be handwiped or lifted with scotch tape 60 seconds subsequent to their preparation.

EXAMPLE V

There were prepared by the solvent extrusion process (single side coated each time) coated transparencies on a Faustel coater by providing a Mylar substrate (roll form) in a thickness of 100 microns and coating thereover a hydrophilic antistatic polymer layer of cationic cellulose (celquat H-100, National Starch) which cellulose was present in a concentration of 3 percent by weight in water. Subsequent to air drying at 100° C. and monitoring the difference in weight prior to subsequent to coating, the dried Mylar had on one side 300 milligrams of the cationic cellulose. This cellulose layer was then overcoated with a toner receiving polymer layer of ethylhydroxyethyl cellulose, of Example II, 30 percent by weight, with the epichlorohydrin/ethylene oxide of Example II, (65 percent epichlorohydrin) 70 percent by weight, which blend was present in a concentration of 2 percent by weight in toluene. Repeating the procedures of Example IV, the bottom side of Mylar was coated first with the cationic cellulose celquat H-100, available from National Starch and then overcoated with a toner receiving layer of the ethyl hydroxy ethyl cellulose 60 percent by weight, and the ethylene/vinyl acetate adhesive (vinyl acetate content, 40 percent by weight) 40 percent by weight, which blend was present in a concentration of 2 percent by weight in toluene. After drying these coatings, the Mylar roll was cut into 20 sheets and 10 of these were fed into the Xerox 1005 TM color imaging apparatus and ten sheets were fed into the Xerox 1025 TM imaging apparatus containing a carbon black toner composition. The average optical density of the 1005 TM images present on the epichlorohydrin/ethylene oxide blended with ethyl hydroxy ethyl cellulose coating layer transparency was 1.70 (black), 0.95 (yellow), 1.50 (cyan) and 1.45 (magenta). The average optical density of 1025 TM images was 1.25. These images could not be handwiped or lifted with scotch tape 60 seconds subsequent to their preparation.

Other modifications of the present invention will occur to those skilled in the art subsequent to a review of the present application. These modifications, as well as equivalents thereof, are intended to be included within the scope of the present invention.

What is claimed is:

1. A transparent substrate material for receiving or containing an image and comprised of a supporting substrate base, an antistatic polymer layer coated on the top and bottom surface of the substrate and comprised of hydrophilic cellulosic components, and a toner receiving polymer layer contained on the top and bottom surface of the antistatic layer, which polymer is comprised of hydrophobic cellulose ethers, hydrophobic cellulose esters, or mixtures thereof, and wherein the toner receiving layer contains adhesive components.

2. A material in accordance with claim 1 wherein the antistatic layer cellulosic components are comprised of (1) hydroxyethyl cellulose, (2) ethylhydroxyethyl cellulose, (3) sodium carboxymethyl cellulose, (4) hydroxypropyl trimethyl ammonium chloride, quaternized hydroxyethyl cellulose or (5) quaternized diethyl ammonium chloride hydroxyethyl cellulose.

3. A material in accordance with claim 1 wherein the hydrophobic cellulosic ethers are comprised of ethylhydroxyethyl cellulose and ethyl cellulose; and the cellulosic esters are comprised of cellulose acetate, cellulose acetate butyrate, cellulose acetate hydrogen phthalate, cellulose acetate phthalate, hydroxypropyl methyl cellulose phthalate.

4. A material in accordance with claim 1 wherein the adhesive components are comprised of epichlorohydrin/ethylene oxide copolymer with an epichlorohydrin content of from about 25 to about 75 percent by weight; ethylene/vinyl acetate with a vinyl acetate content of from about 40 to about 70 percent by weight, poly(chloroprene), poly(caprolactone), or a styrene-butadiene copolymer with a butadiene content of from about 10 to about 80 percent by weight.

5. A material in accordance with claim 1 wherein the toner receiving layer is comprised of from about 10 to about 90 percent by weight of hydrophobic ethylhydroxyethyl cellulose, and from about 90 to about 10 percent by weight of an epichlorohydrin/ethylene oxide copolymer adhesive.

6. A material in accordance with claim 5 wherein the epichlorohydrin content is about 65 weight percent.

7. A material in accordance with claim 1 wherein the toner receiving layer is comprised of from about 10 to about 90 percent by weight of hydrophobic ethylhydroxyethyl cellulose, and from about 90 to about 10 percent by weight of an ethylene/vinyl acetate copolymer.

8. A material in accordance with claim 7 wherein the vinyl acetate content is about 40 percent by weight.

9. A material in accordance with claim 1 wherein the toner receiving layer is comprised of from about 10 to about 90 percent by weight of a hydrophobic ethylhydroxyethyl cellulose and from about 90 to about 10 percent by weight of poly(caprolactone); a blend of hydrophobic ethylhydroxyethyl cellulose from about 10 to about 90 percent by weight and poly(chloroprene) from about 90 to about 10 percent by weight; a blend of hydrophobic ethylhydroxyethyl cellulose from about 10 to about 90 percent by weight and styrene-butadiene copolymer from about 90 to about 10 percent by weight; a blend of hydrophobic ethyl cellulose from about 10 to about 90 percent by weight and epichlorohydrin/ethylene oxide copolymer from about 90 to about 10 percent by weight; a blend of ethyl/vinyl acetate copolymer from about 90 to about 10 percent by weight, and from about 10 to about 90 percent by weight of cellulose acetate, or cellulose acetate butyrate; or a a blend of ethylene/vinyl acetate from about 90 to about 10 percent by weight and from about 10 to about 90 percent by weight of cellulose acetate hydrogen phthalate, cellulose acetate phthalate, or hydroxy propyl methyl cellulose phthalate.

10. A material in accordance with claim 1 wherein the supporting substrate is selected from the group consisting of cellulose acetate, poly(sulfone), poly(propylene), poly(vinyl chloride) and poly(ethylene terephthalate).

11. A material in accordance with claim 1 wherein the substrate is of a thickness of about 75 to 125 microns, the antistatic layer is of a thickness of from about 2 to about 10 microns and the toner receiving layer is of a thickness of from about 1 to about 5 microns.

12. A material in accordance with claim 1 wherein the ink receiving layer contains fillers.

13. A material in accordance with claim 12 wherein the fillers are comprised of colloidal silica, calcium carbonate, titanium dioxide, or mixtures thereof.

14. A material in accordance with claim 13 wherein the fillers or mixtures thereof are present in an amount of from 2 to about 25 percent by weight of the toner receiving layer.

15. A material in accordance with claim 1 wherein the toner receiving layer on the top side of the supporting substrate in contact with the antistatic layer is of a different composition than the toner receiving layer on the bottom side of the supporting substrate in contact with the antistatic layer.

16. A material in accordance with claim 1 wherein the antistatic layer on the top and bottom side of the supporting substrate are comprised of different components.

17. An image receiving member for an electrographic, or an electrophotographic imaging process, which member is comprised of the material of claim 1.

18. A transparency comprised of a supporting substrate, an antistatic polymer layer coating and a toner receiving polymer layer, which polymer is comprised of hydrophobic cellulose ethers, cellulose esters, or mixtures thereof, and low melting adhesive components.

19. A transparency in accordance with claim 18 wherein the antistatic polymer layer is present on the top and bottom surface of the substrate, and toner receiving polymer layer is present on the top and bottom surface of the antistatic polymer layers.

20. A transparency in accordance with claim 18 wherein the antistatic polymer layer is comprised of hydrophilic cellulosic components.

21. A transparency in accordance with claim 18 containing an image thereon.

22. A transparency in accordance with claim 18 wherein the low melt adhesive components are contained in the toner receiving layer.

23. A transparency in accordance with claim 19 wherein the low melt adhesive components are contained in the toner receiving layer.

24. A material in accordance with claim 1 wherein the adhesive components are comprised of epichlorohydrin/ethylene oxide copolymer, ethylene/vinyl acetate, poly(chloroprene), poly(caprolactone), or a styrene-butadiene copolymer.

25. A material in accordance with claim 1 wherein the adhesive has a melting temperature of from about 50 to about 75 degrees Centigrade.

26. A material in accordance with claim 24 wherein the adhesive has a melting temperature of from about 50 to about 70 degrees Centigrade.

27. A transparency comprised of a supporting substrate, an antistatic polymer layer coated on both sides of the substrate and comprised of hydrophilic cellulosic components, and a toner receiving polymer layer contained on both sides of the antistatic layer, which polymer is comprised of hydrophobic cellulose ethers, hydrophobic cellulose esters, or mixtures thereof, and wherein the toner receiving layer contains adhesive components.

28. An imaged transparency comprised of a supporting substrate, an antistatic polymer layer coated on one side, or both sides of the substrate, which layer is comprised of hydrophilic cellulosic components, and a toner receiving polymer layer contained on one side, or both sides of the antistatic layer, which toner receiving polymer is comprised of hydrophobic cellulose ethers, hydrophobic cellulose esters, or mixtures thereof, and wherein the toner receiving layer contains adhesive components.

29. A transparent substrate material for receiving or containing an image and consisting essentially of a supporting substrate base, an antistatic polymer layer coated on the top and bottom surface of the substrate and consisting essentially of hydrophilic cellulosic components, and a toner receiving polymer layer contained on the top and bottom surface of the antistatic layer, which polymer is consisting essentially of hydrophobic cellulose ethers, hydrophobic cellulose esters, or mixtures thereof, and wherein the toner receiving layer contains adhesive components.

30. A transparency comprised of a supporting substrate, an antistatic polymer layer coating and a toner receiving polymer layer, which toner receiving polymer is comprised of hydrophobic cellulose ethers, cellulose esters, or mixtures thereof, and low melting adhesive components.

* * * * *